No. 672,152.　　　　　　　　　　　　　　　　Patented Apr. 16, 1901.
L. E. RUHER.
TRUCK.
(Application filed Dec. 3, 1900.)
(No Model.)
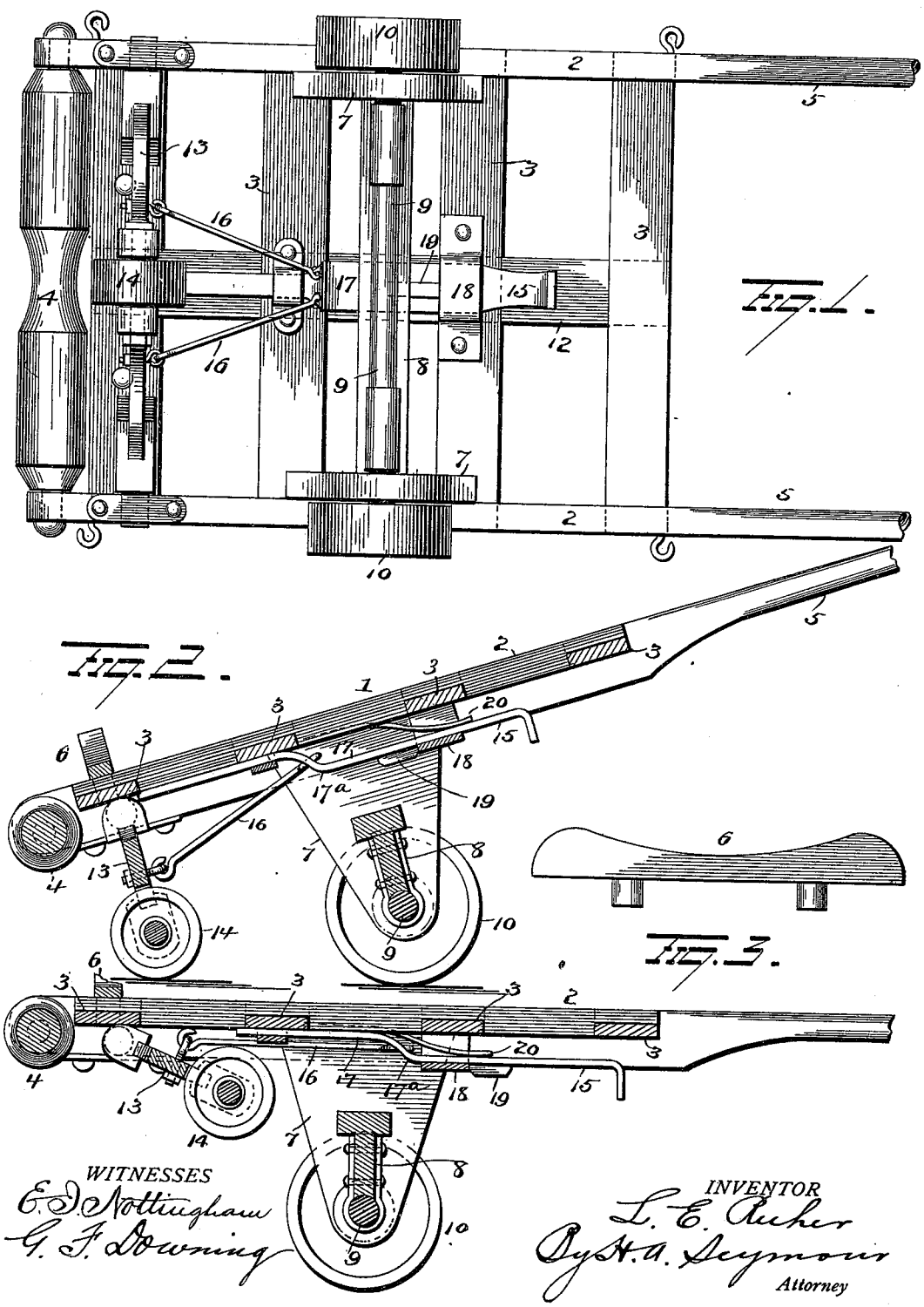

UNITED STATES PATENT OFFICE.

LOUIS EUGÈNE RUHER, OF WAVERLY, NEW YORK.

TRUCK.

SPECIFICATION forming part of Letters Patent No. 672,152, dated April 16, 1901.

Application filed December 3, 1900. Serial No. 38,459. (No model.)

*To all whom it may concern:*

Be it known that I, LOUIS EUGÈNE RUHER, of Waverly, in the county of Tioga and State of New York, have invented certain new and useful Improvements in Trucks; and I do hereby declare the following to be a full, clear, and exact description of the invention, such as will enable others skilled in the art to which it appertains to make and use the same.

My invention relates to an improvement in trucks, and more particularly to that class of trucks designed for moving stoves, trunks, barrels, boxes, &c., the object being to provide a strong and compact device capable of supporting heavy burdens in an evenly-balanced manner and which may be easily controlled in both ascending and descending steps and without requiring undue exertions on the part of the laborer.

With this end in view my invention consists in certain novel features of construction and combinations of parts, as will be hereinafter more fully described, and pointed out in the claims.

In the accompanying drawings, Figure 1 represents a view of my improved truck. Fig. 2 is a longitudinal section thereof; and Fig. 3 is a similar view, the yoke being represented in its inoperative position.

1 represents a frame or platform for receiving the burden to be moved. This platform comprises the side members 2 2, a series of cross-bars 3, connecting said side members, a central bar 12 parallel with the side members and connecting the cross-bars 3, and a roller 4, mounted between the front ends of the side members 2 2, the opposite ends of the latter being shaped to form handles 5 5 for operating the truck.

The forward cross-bar 3 is provided on its upper face with a removable stop 6 for preventing the burden carried by the truck from sliding off the platform when the truck is at rest or being rolled upon level surfaces. This stop is concaved on its top to receive the convexed surface of a barrel or other object, whereby the latter may be firmly supported against sidewise movement while the truck is being moved or is at rest.

Secured to the side members 2 2 of the platform and depending therefrom are the oppositely-located brackets or hangers 7 7, which latter are so situated with respect to the burden-supporting surface of said platform as to support the entire weight placed centrally upon the platform, thus rendering it possible for the operator to easily handle the truck without being required to assist in sustaining any of the weight carried by the truck. The brackets or hangers 7 7 are prevented from spreading apart or collapsing at their free ends by a bar 8, which connects the two brackets firmly together, and rigidly secured to the bottom edge of this bar is an axle 9, the free ends of which project through bearings in said brackets to receive the wheels 10 10, which are revolubly supported thereon.

Mounted in suitable bearings carried in the forward ends of side members 2 2 is a swinging yoke 13, in which is suitably mounted the auxiliary wheel 14, which latter is only used when the truck is being pushed over level surfaces. This yoke is supported either in its operative or inoperative position by means of a spring-actuated catch 15, carried against the bottom of platform 1, and is coupled up with said yoke by the rods 16. This catch consists of a plate 17, bent at or near its center, as shown at $17^a$, so as to bring its forward or narrower end in a higher horizontal plane than the plane of the rear or wider end. This plate is supported by and slides through the loops 18, depending from the under side of the platform, and is adapted to be locked in either of its positions by means of a rib 19, formed on the bottom face of the wide portion of plate 17, and a flat spring 20, the free end of which latter projects within the large loop 18 and rests against said plate. This rib projects from the under side of plate 17, and when the swinging yoke is in its inoperative position the said rib bears against the rear side of the large loop 18. To throw the yoke to its operative position, the plate 17 should be pressed up to disengage the rib from the loop and then pushed forwardly. This movement carries the rib through the large loop, and when the plate 17 is released the rib is in advance of the loop, and thus locks the yoke in its operative position. The spring 20 bears down on the plate and normally holds the same in contact with the loop. Hence it will be seen that when the rib passes the loop the spring automatically throws the rib into a position to lock the yoke against accidental movement.

While this truck is designed for transporting heavy loads either on plane surfaces or steps, it is particularly designed for carrying heavy loads up and down stairs.

The ascent of a flight of steps is accomplished in practically the following manner: After the burden to be moved has been securely fastened to the platform by chains, ropes, or other fastening devices the truck is rolled in front of the steps to be ascended, and after being placed in a position in front of the lower step and after the swinging yoke has been turned to its inoperative position the roller on the front end of the platform is lowered onto the tread of the second step. By now lifting on the handles so as to elevate the main wheels to a position in line with the tread of the first step the truck can be pushed forwardly until the main wheels are resting on the first step. The handles are now depressed to bring the roller above the plane of the riser of the tread of the third step, and the handles are then elevated and the truck pushed forwardly to bring the main wheels on the tread of the second step, and so on throughout the entire flight. After it has passed the steps the swinging yoke can then be turned to bring its wheel in a position to support the front end of the truck. In descending steps the truck should be rolled to the top of the stairs, and after the main wheels have been lowered onto the first step the yoke should be swung to its inoperative position, so as to permit the roller to engage the floor. The truck is now drawn forwardly, and when the main wheels reach the edge of the top step the handles should be lifted, so as to throw the weight on the roller, and then by lowering the handles the main wheels are lowered on the second step. By now depressing the front end of the platform the roller is now lowered on the front step, and so on throughout the entire series of steps.

It is evident that changes in the construction and relative arrangement of the several parts might be made without avoiding my invention, and hence I would have it understood that I do not restrict myself to the particular construction and arrangement of parts shown and described; but, Having fully described my invention, what I claim as new, and desire to secure by Letters Patent, is—

1. In a truck, the combination with a platform mounted on a single set of wheels disposed centrally between the ends of the platform, of an auxiliary wheel having a swinging connection with the forward portion of said platform and means for locking said wheel in its operative and inoperative positions, substantially as set forth.

2. In a truck, the combination with a platform mounted on a pair of main wheels, of a yoke pivotally connected with the forward portion of said platform, a wheel mounted in said yoke and adapted to travel in advance of the main wheels and means for locking said wheel either in its operative or its inoperative position, substantially as set forth.

3. In a truck, the combination with a platform mounted on a pair of oppositely-disposed wheels, of an auxiliary wheel having a swinging connection with the forward end of said platform and a spring-actuated catch carried by the platform and adapted to lock said wheel either in its operative or inoperative position, substantially as set forth.

4. In a truck, the combination with a platform, centrally-located main supporting-wheels, a roller mounted in the front ends of the side bars of the platform and handles at the rear ends of said side bars, of a yoke pivotally connected with the platform between the main wheels and roller and in proximity to the latter, a wheel mounted in the lower end of the yoke and means for locking the yoke.

5. The combination with a platform, supporting-wheels located intermediate the ends of said platform, a roller at the forward end and handles at the rear end of said platform, of a swinging yoke intermediate the main wheels and roller and carrying a wheel and a stop detachably secured on the top of the platform immediately behind the roller, substantially as set forth.

In testimony whereof I have signed this specification in the presence of two subscribing witnesses.

LOUIS EUGÈNE RUHER.

Witnesses:
JOHN T. GUNTHER,
E. A. VAUGH.